(12) United States Patent
Yamaguchi et al.

(10) Patent No.: US 6,327,811 B1
(45) Date of Patent: Dec. 11, 2001

(54) CAPTURING DEVICE

(76) Inventors: Kanichi Yamaguchi, 5-17-11 Nishishinjyuku, Shinjyuku-Ku, Tokyo 160-0023; Umeo Yamauchi, 2-7-2 Yoyogi, Shibuya-Ku, Tokyo 151-0053, both of (JP)

( * ) Notice: Subject to any disclaimer, the term of this patent is extended or adjusted under 35 U.S.C. 154(b) by 0 days.

(21) Appl. No.: 09/597,756

(22) Filed: Jun. 19, 2000

Related U.S. Application Data

(62) Division of application No. 09/377,826, filed on Aug. 20, 1999, now abandoned.

(30) Foreign Application Priority Data

Sep. 1, 1998 (JP) .................................................. 10-246438

(51) Int. Cl.[7] .............................. A01M 1/20; A01M 1/14
(52) U.S. Cl. ................................ 43/114; 43/107; D22/122
(58) Field of Search ............................. 43/107, 113, 121, 43/131, 114, 122; D22/122

(56) References Cited

U.S. PATENT DOCUMENTS

| | | | |
|---|---|---|---|
| D. 212,221 | * 9/1968 | Callahan | D22/122 |
| D. 243,765 | * 3/1977 | Nakai | D22/122 |
| D. 371,418 | * 7/1996 | Rubel | D22/122 |
| 1,015,643 | 1/1912 | Serafinski . | |
| 4,031,654 | 6/1977 | Gray | 43/114 |
| 4,490,938 | * 1/1985 | Baker | 43/114 |
| 4,802,303 | 2/1989 | Floyd, III | 43/131 |
| 4,930,251 | 6/1990 | Crisanti | 43/107 |
| 4,988,024 | * 1/1991 | Peek | 43/122 |
| 5,048,224 | 9/1991 | Frisch | 43/114 |
| 5,243,781 | * 9/1993 | Carter | 43/122 |
| 5,339,563 | * 8/1994 | Job | 43/122 |
| 6,138,402 | * 10/2000 | Wotton | 43/122 |

* cited by examiner

*Primary Examiner*—Kurt Rowan
(74) *Attorney, Agent, or Firm*—Arent Fox Kintner Plotkin & Kahn, PLLC

(57) ABSTRACT

The doll body 64 which consists of the decorative doll is attached to the exchange member 68 removably. The exchange member 68 is attached to the pedestal member 62 by the post member 67 which is also used as the foot 65. The exchange member 68 is a dual or a single cylindrical structure. In case of a dual cylindrical structure, the inner cylinder fits into the post member 67. Insects like cockroaches crawls up along the foot 65 of the doll. They are enticed to come into the space made by two cylindrical members of the exchange member 68, and caught by the adhesive member which is not shown in Figure. As the appearance of this device is a doll, it is possible to set this on conspicuous places without hesitation. The exchange member 68 can be exchanged appropriately.

2 Claims, 11 Drawing Sheets

CAPTURING DEVICE

This application is a Divisional Application of prior U.S. patent application Ser. No. 09/377,826, filed Aug. 20, 1999 which is hereby abandoned. The disclosure of the prior application is incorporated herein by reference in its entirety.

BACKGROUND OF THE INVENTION

The present invention relates to a device for catching insects, such as cockroaches, more particularly, to a device which is suitable for capturing insects.

In general, adhesive sheets are widely used for capturing insects like cockroaches.

Most glue traps are made of cardboard. They look like a house or a room and have a space to lock up cockroaches. In that space, an adhesive member is spread, cockroaches are enticed to come into this adhesive space, and are caught by an adhesive member. There is a problem that the area of the base becomes relatively large in order to catch plenty of insects like cockroaches. That is, it is difficult to set these kind of traps in small spaces like the place between the wall and the furniture. Therefore instead of this kind of devices, we have to set insecticides such a poisoned food. However these insecticides also have a problem. They are not perfectly safe when children or pets touch them.

And as these papered traps are disposed after used, the cost is low. Therefore it is difficult to take a good appearance info consideration. People usually set the glue traps in invisible and hidden places such as under the floor. There is another problem that setting places are limited. As FIG. 1 shows, this kind of glue trap has big entrances for harmful insects to come into. Therefore there is a problem that this glue trap is not suitable for setting in places where there are food and water, for example a sink in a kitchen. Cockroaches like these places and swarm there.

SUMMARY OF THE INVENTION

One of the objects of the present invention is to provide e a device which can be put In relatively small spaces to capture insects.

Another object of the present invention is to provide a device which can be put on visible places to capture and get rid of harmful insects.

A further object of the present invention is to provide a device which is useful and works for capturing insects in places where there are food and water.

The present invention provides a space for insects to come into between an outer and an inner cylinder. Cockroaches are enticed to come into this space and are caught by an adhesive member. An inner cylinder is fit into a post, but it can be removed if necessary. A post is supported by a pedestal. Therefore in the present invention, by attaching the inner capturing cylinder to the post and covering this with the outer capturing cylinder, it is possible to lock up cockroaches in this inner space. Thanks to an outer capturing cylinder, insects are hidden in the space and invisible to people. As both an outer and an inner capturing cylinders can be removed together it is easy to exchange catching members. Also if a pedestal is designed with good sense, this capturing device can be used as an interior decoration. And it is possible to be more effective for capturing insects by putting this device in the visible places like on the table. And the cylinder can be single or dual or multiplex.

Additional features and advantages of the invention will become apparent from the ensuing description and claims read in conjunction with the attached drawings.

DETAILED DESCRIPTION OF PREFERRED EMBODIMENTS

Figure 1:
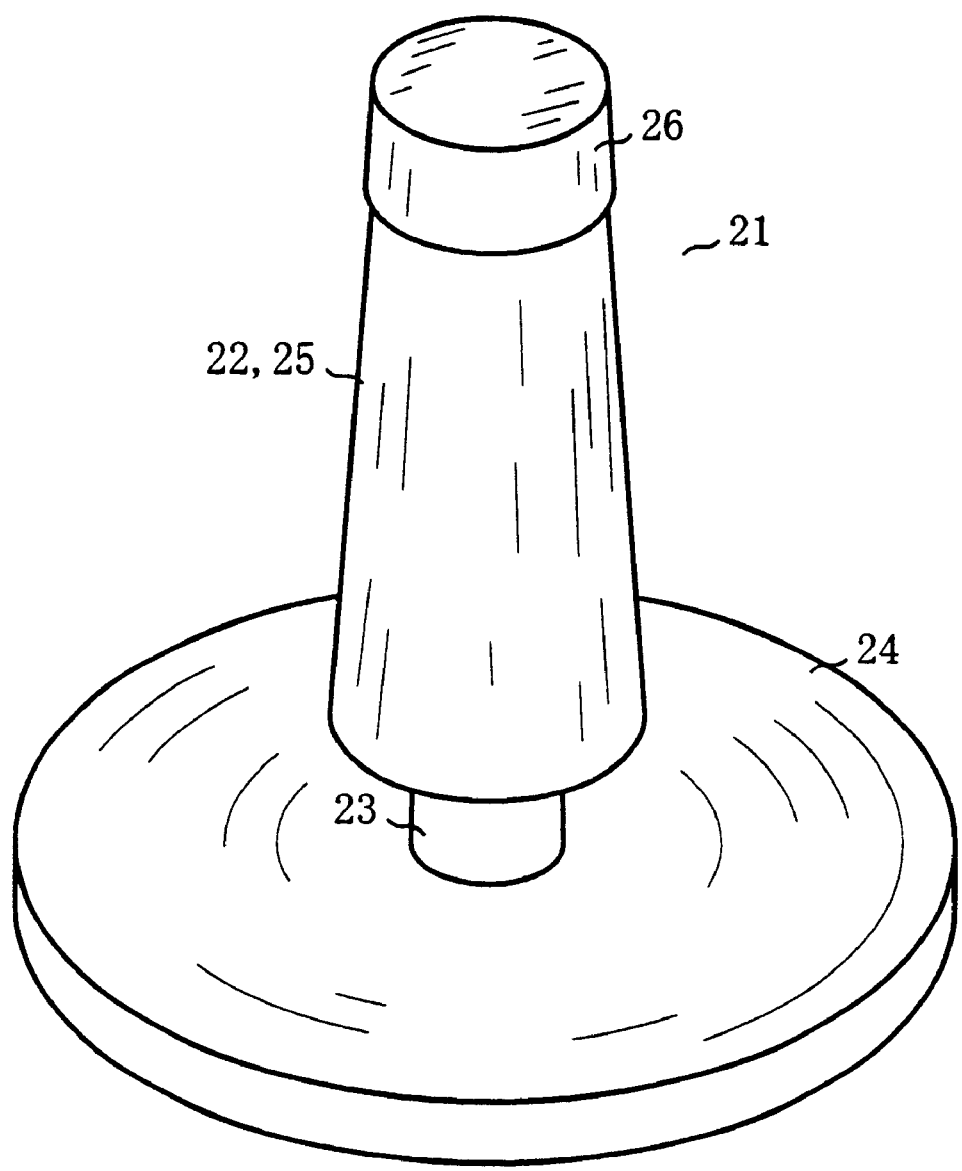
FIG. 1 is a perspective view of the capturing device in one embodiment of the invention.

FIG. 1 is a perspective view of the capturing device in one embodiment of the present invention. The capturing device 21 in this embodiment consists of the exchange member 22, the post member 23, which supports the exchange member 22, and the pedestal member 24 which supports the post member 23. The post member 23 attains and removes the exchange member 22 easily. The pedestal member 24 is made of wood which was cut into a shape like a stump. The post member 23 is also made of wood. Wood makes this capturing device more natural and decorative. In another case, the pedestal member 24 and the post member 23 can be also made of grained plastics. If the plastics look like wood, this device can keep a decorative appearance. The pedestal member 24 is not always necessary, it depends on the location where the capturing device 21 is set as mentioned later.

The exchange member 22 is disposed, when it catches a lot of insects. As explained in the following, the exchange member 22 is a dual cylindrical structure. In FIG. 1, only the plastic outer cylinder 25 is visible. The inner cylinder is hidden in the outer cylinder 25. The cap 26 is removable and attached to the top of the outer cylinder 25 so that the bait can be changed. It is also possible that the outer cylinder 25 and the cap 26 are made as one body. In this case, as the cap 26 is not removable, the bait can not be changed.

Figure 2:
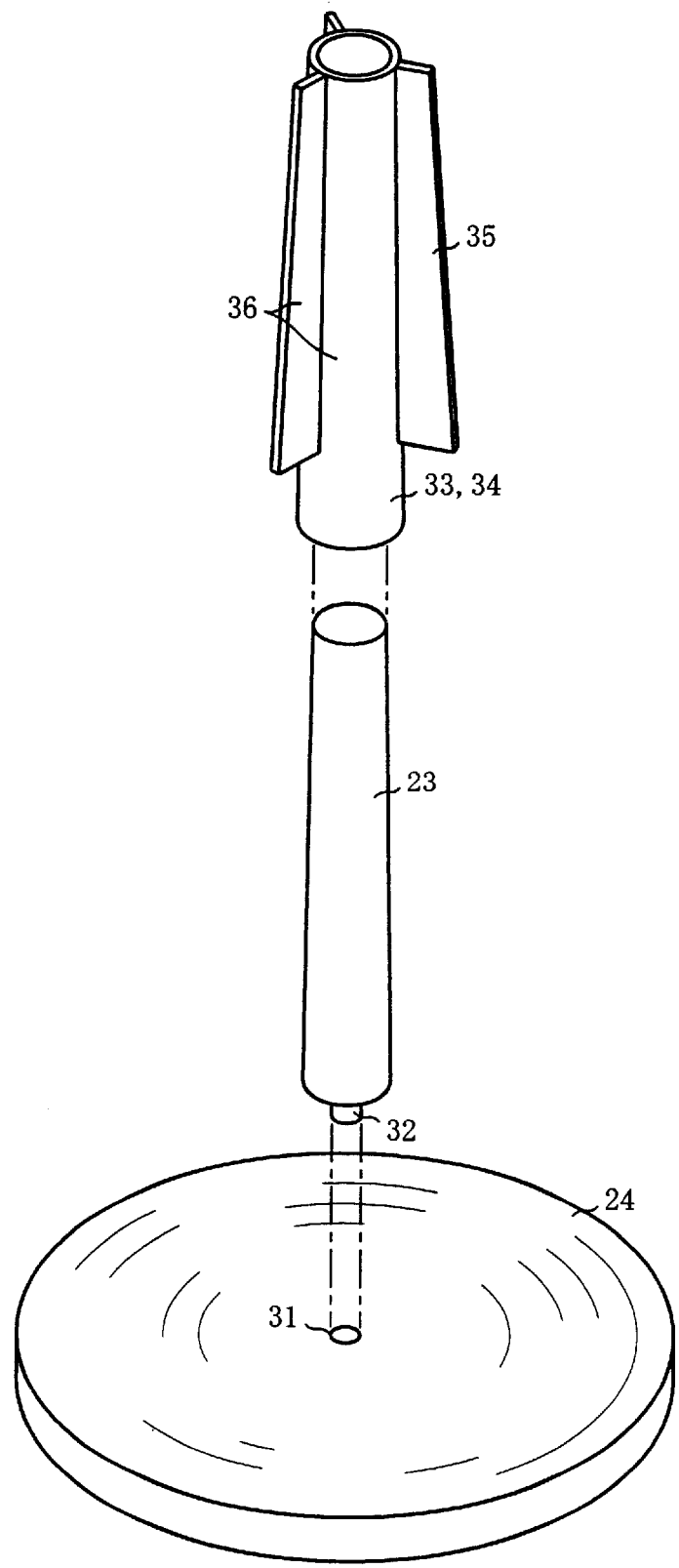
FIG. 2 is an exploded view of the exchange member in this embodiment without the outer capturing cylinder and the cap, showing a way to put together every parts.

FIG. 2 is an exploded view of the exchange member without the outer cylinder and the cap. The pedestal member 24 is provided with the attachment hole 31 on the center of it. The post member 23 is fixed into the pedestal member 24 by fitting the cylindrical protuberance member 32 projecting from the base section of the post member 23 into the attachment hole 31. The bottom of the post member 23 has a little wider external diameter than the top of the post member 23 does.

The inside pole of the exchange member 22 shown in FIG. 1 consists of the inner cylinder 33, which consists of the circular cylinder 34 and three partitions 35. The circular cylinder 34 has an internal diameter which is a little wider than the external diameter of the top-part post member 23. The three partitions 35 are attached around the circular cylinder 34 at intervals of 120 degrees at right angles with the circular cylinder 34 along the axis of the circular cylinder 34. And the width of these partitions become wider as the partition closes to the base section of the inner cylinder 33. The diameters of the circle, which these three partitions 35 are inscribed are the same size as the internal diameters of the outer cylinder 25 shown in FIG. 1. The surface of the circular cylinder 34 and the surface of the partitions are applied the adhesive member 36. However it is not always applied. In another embodiment, the adhesive member 36 can be applied only to the surface of the circular cylinder 34.

Figure 3:
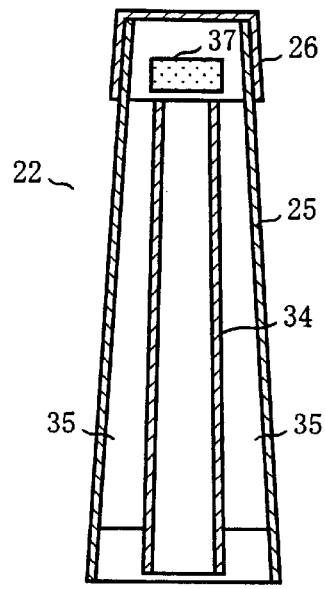
FIG. 3 is a cross-sectional view illustrating the exchange member of this embodiment.

FIG. 3 is a cross-sectional structure of the exchange member. The inside of the outer cylinder 25 touches with the partitions 35. The bait 37 giving off a smell which cockroaches like is put in the inside space of the top-part outer cylinder 25, the top section of the circular cylinder 34. The smell of this bait 37 spreads down to the bottom of the exchange member 22 through the space, which is made by three partitions 35, the outer cylinder 25 and the surface of the circular cylinder 34. This smell entices cockroaches to come into this space. The enticed cockroaches move up to this smell and are caught by the adhesive member 36 ( see FIG. 2 ). When the power of the bait 37 to entice the insects to swarm in this device becomes less effective, it is possible to put off the cap 26 and to exchange the bait for a new one.

The capturing device 21 shown in FIG. 1 is vertical and the pedestal member 24 is small. Therefore this capturing device 21 can be put on a small space such as the space between the wall and the furniture. Also even if this capturing device 21 is put on the places where the water might fall on them, for example on the corner of the kitchen or near the washing machine, the catching effect of this capturing device 21 will not get worse, because the top of the outer cylinder 25 has no entrances for water to come in. Moreover as the capturing device 21 of this embodiment has a good appearance, it is possible to set it on the furniture such as a table in the kitchen positively. And only the exchange member 22 is disposed, the other parts of this capturing device 21 can be reused. Accordingly the cost of maintenance for this capturing device 21 could keep low.

The First Variation

Figure 4:
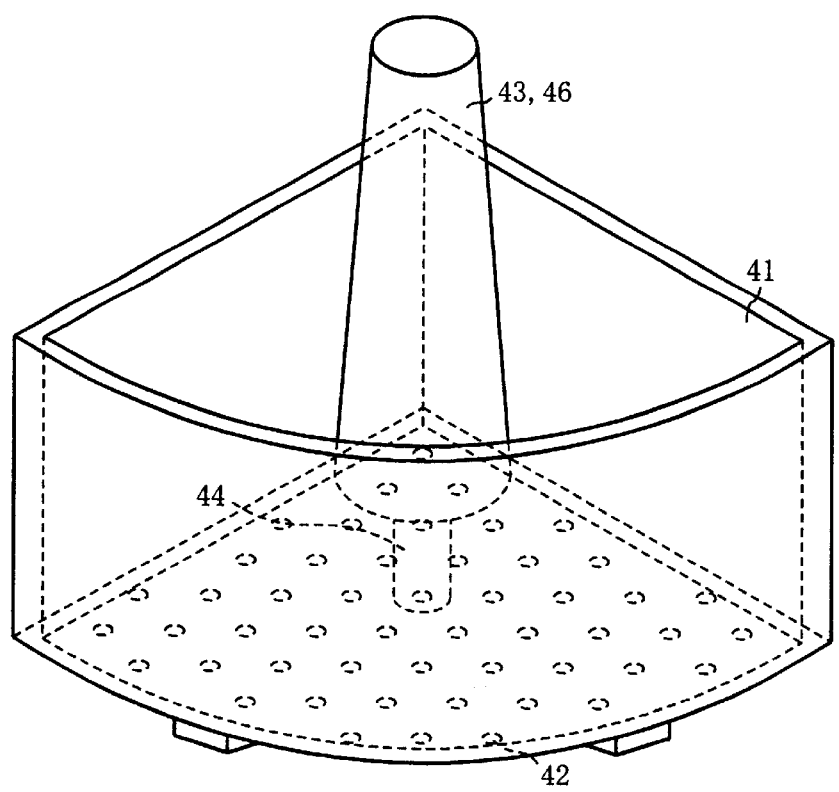
FIG. 4 is a perspective view of the capturing device in the first variation of the invention.

FIG. 4 shows the view that the capturing device in the first variation of the invention is attached to a garbage box in the sink. The garbage box is a container for garbage, scraps of vegetables or the peel of apples and this is usually set in the sink. A plastic garbage box 41 has a lot of holes 42 through which water goes down, on its bottom. The diameter of these holes 42 is established to be the same size as the diameter of the cylindrical protuberance member not shown in this figure (see the protuberance member 32 in said embodiment ) which is projecting from the base section of the post member 44 in the capturing device 43. Therefore, in this variation, the capturing device 43 can be attached to the inside of the garbage box 41 only by pushing the post member 44 into one of the holes 42.

In this variation, as the capturing device 43 is set up inside the garbage box 41, the bait 37 which is shown in FIG. 3 is not necessary to put in. In the capturing device 43 composed of double cylinders, insects crawls up between the surface of the inner cylinder which is not shown in the capturing device 43 and the inside surface of the outer cylinder 46. And a lot of insects are caught by the adhesive member which is applied on either or both surfaces. This is confirmed by experiments.

In this variation, the capturing device 43 does not always need the outer cylinder 46. Even if an inner cylinder such as the inner capturing cylinder 33 in FIG. 2 just stands and is exposed at the center of the garbage box 41, this device is also effective enough to catch insects. However, by attaching the outer cylinder 46 to the outside, water will not splash on the capturing device 43 while cooking in the kitchen. Moreover when garbage is dumped in the garbage box 41, it doesn't weaken the effect of an adhesive for catching insects. And as the outer cylinder 46 hides the captured insects from a person's sight, it is possible to use the capturing device 43 comfortably for a long time.

Referring to dumping the garbage in the garbage box 41, it may be one way to throw away the whole capturing device 43 wrapped by a draining net with garbage if the draining net covers the inside of the garbage box 41. Also it is possible to reuse the post member 44.

The Second Variation

Figure 5:
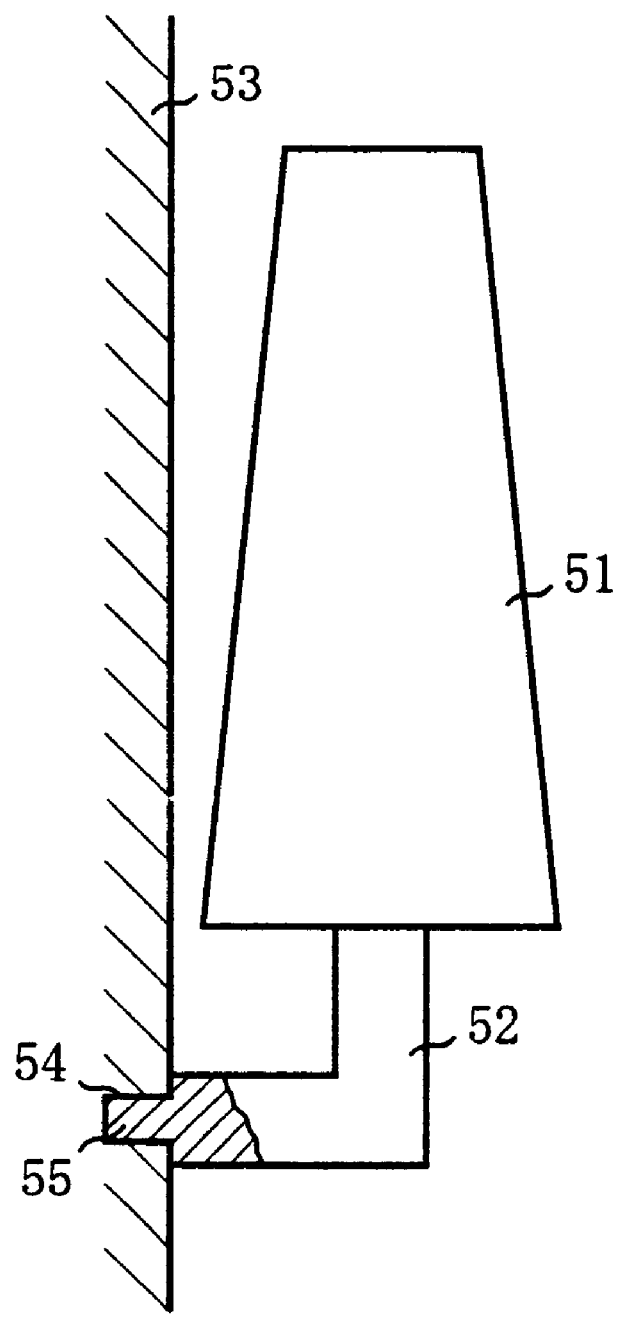
FIG. 5 is a partial cross-sectional view of the capturing device in the second variation of the invention while set on the wall of a kitchen.

FIG. 5 shows a view that a capturing device in the second variation of the invention is set on the wall of a kitchen. In the capturing device 51 of this invention, the post member 52 is L-shaped. The cylindrical protuberance member 55 (see the protuberance member 32 in a embodiment) is fit into the hole 54 provided on the wall 53. In this way, it is possible to make the hole 54 on the wall 53 or furniture as you like, and to attach the capturing device 51 to the proper places. And also it is easy to attach and remove it. It is not necessary to make the hole 54 on the wall 53 or furniture. It may be another way to fix the post member 52 on the proper places by a glue.

The Third Variation

Figure 6:
FIG. 6 is a front view showing an example of the capturing device, which is suitable for setting on a table or an alcove, in the third variation of the invention.

FIG. 6 shows an example of the capturing device, which is suitable for setting on a table or an alcove, in the third variation of this invention. Referring to the capturing device 21 in FIG. 1, if the outer capturing cylinder 25 is made of colorful and beautiful materials, it may be possible to set on a conspicuous place such as on a table as an interior decoration. Moreover in the third variation of the invention, adding an optional attachment makes this device more decorative. Accordingly there is a merit that it can be used not just as a capturing device but as an interior decoration by setting on a table of a restaurant or near a wall of a tearoom and it is possible to capture insects without people noticing the set glue traps.

In the capturing device 61 of the third variation, the doll 63 is put on the pedestal 62. The doll 63 consists of the doll body 64 and the foot 65. The doll body may be made of cloth, the normal dress for a doll. Porcelain, plastic and materials processed with ceramics over plastic and colored may be used for the doll body. If possible, it is desirable that the doll body feels like arts and crafts. The foot 65 of the doll is fixed on the pedestal 62. The doll body 64 is possible to pull it up. The hem of a dolls dress which the doll body 64 is inserted into is flared like a horn. And it is designed so that insects like cockroaches can come in along the foot 65.

Figure 7:
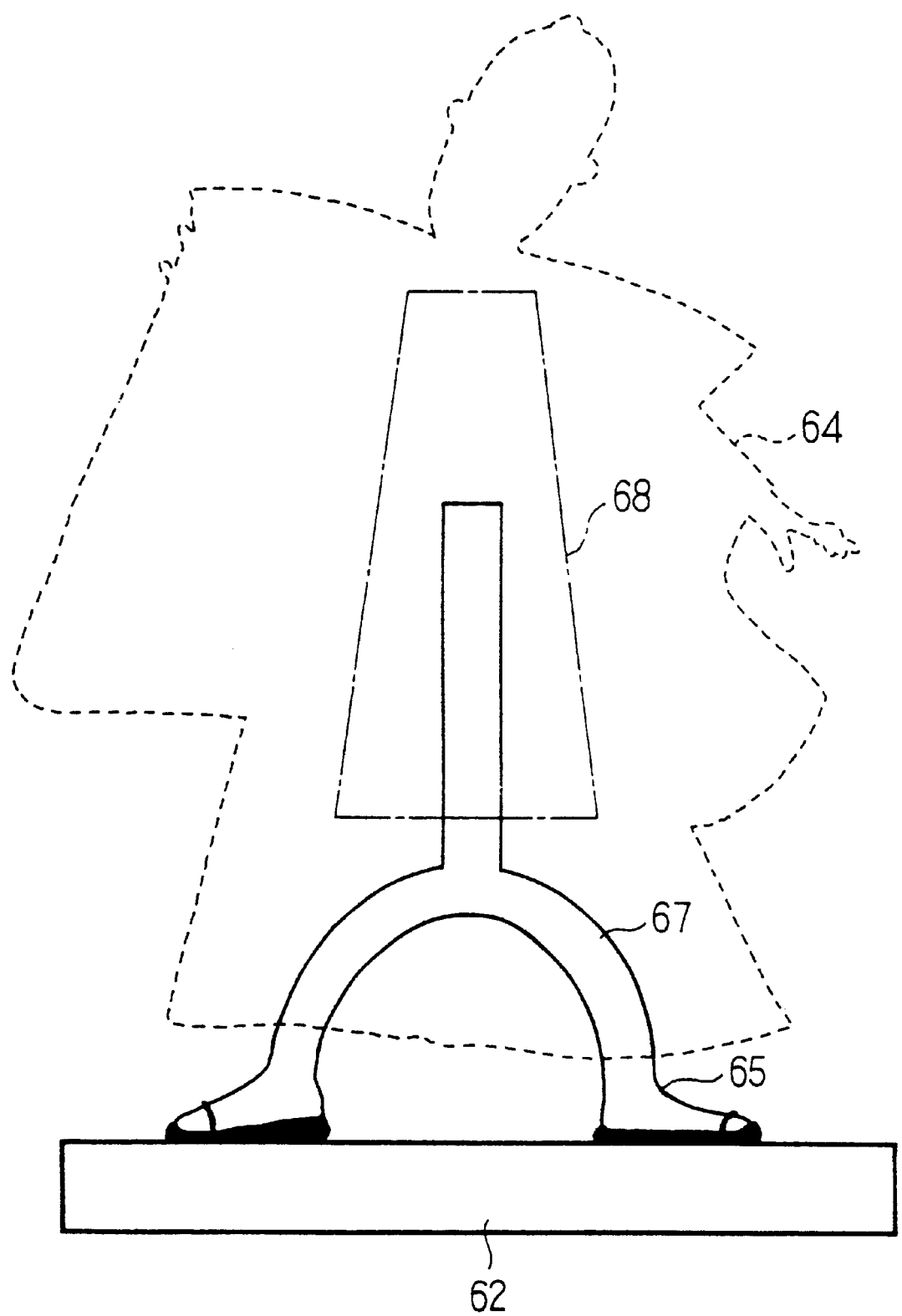
FIG. 7 is a front view showing the inner structure of the capturing device in the third variation of the invention.

FIG. 7 is an inner structure of the capturing device in the third variation. The foot 65 is composed as a part of the post member 67 which is an inverted Y-shaped prop. Referring to the post member 67, the exchange member 68, which is the same as the exchange member 22 in the other embodiments, is attached to the post member 67. Insects come into this inner space and are caught by the adhesive member. The size of the exchange member 68 can change according to the size of the doll body 64. Inside the doll body 64, a cylindrical hollow is provided so that the exchange member 68 fits therein. Therefore it is possible to exchange the exchange member 68 if necessary.

Moreover if there are some variation of the doll body 61 and the post member 67 can be exchanged appropriately, it is also possible to replace the doll body 61 with a new one regularly. In another case that the doll body 61 shapes like an animal, the foot part of this ornament is not necessary exposed.

The Fourth Variation

Figure 8:
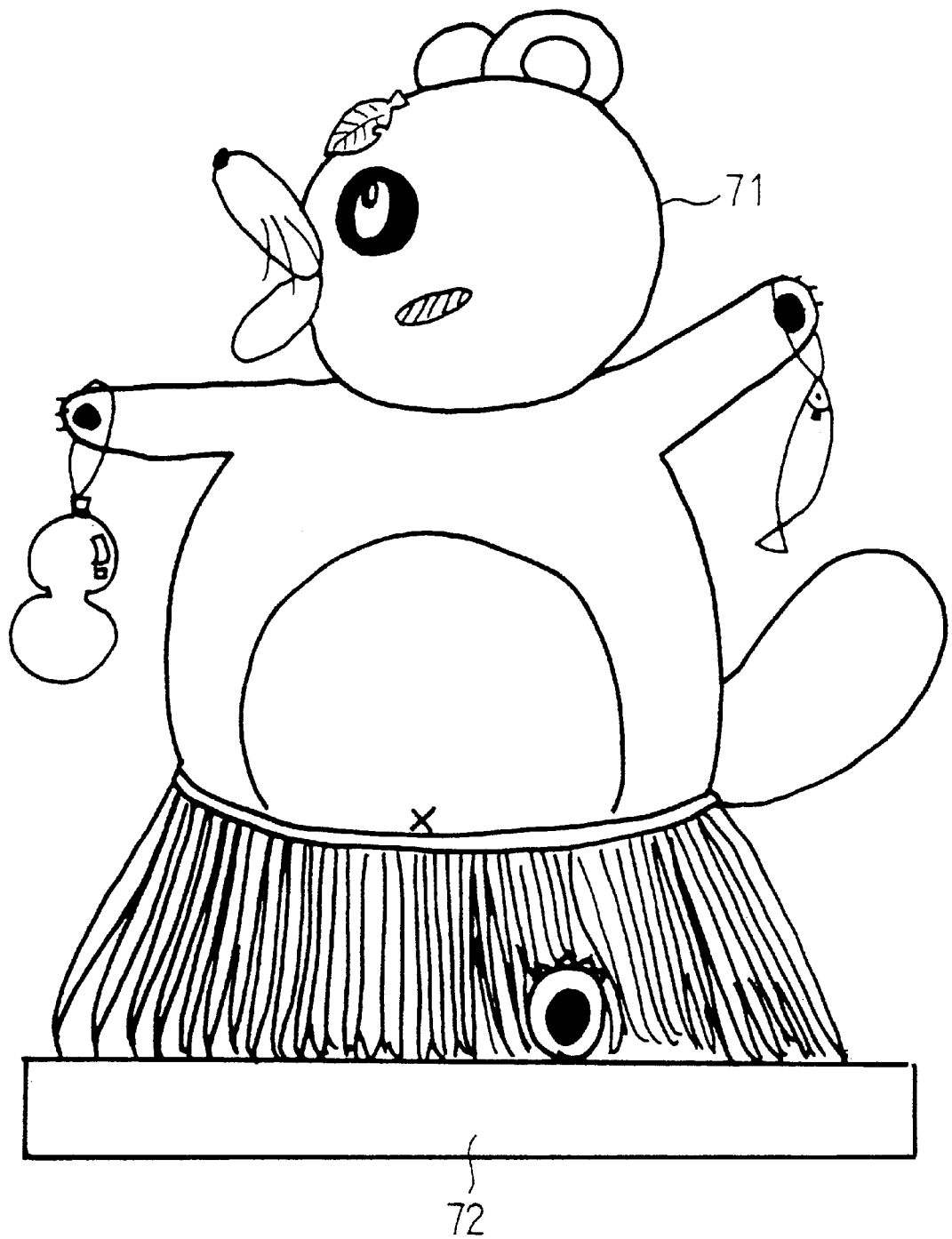
FIG. 8 is a front view showing an example that the present invention is applied to the raccoon dog ornament as the fourth variation of the invention.

FIG. 8 shows an example which the invention applies to an ornament shaped like a raccoon dog as the fourth variation of the invention. The raccoon dog ornament 71 is attached on the pedestal member 72. The post member is not exposed.

Figure 9:
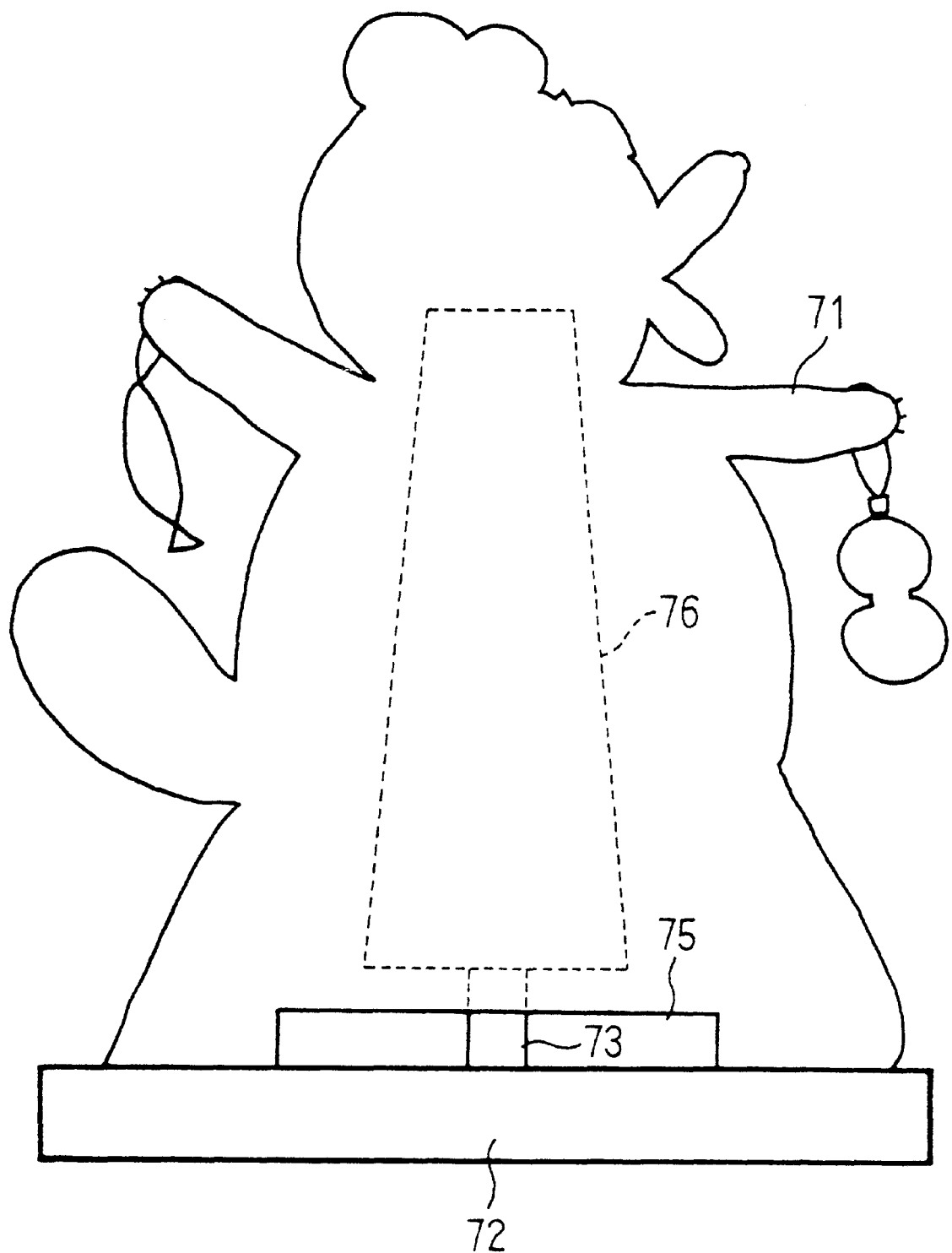
FIG. 9 is a back view of the raccoon dog ornament as the fourth variation of the invention.

FIG. 9 is a back view of the raccoon dog ornament. To make it clear, the ornament member is shown only by an outline. The post member 73 is attached at the center of the pedestal member 72. And the opening member 75 is provided at the back of the raccoon dog ornaments bottom so that insects such as cockroaches can come in. The insects come in through the opening member 75, climb up along the post member 73, and at last are caught inside the exchange member 76. In this variation the post member 73 is attached to the pedestal member 72. While in the case of setting the raccoon dog ornament 75 on the floor directly, it is also possible to provide a pedestal member which is one size smaller than the pedestal member 24 in FIG. 1 and to set this inside the raccoon dog ornament 71.

When the interior ornaments such as a doll themselves have a good stability, the pedestal member is not necessary. In these ornaments, the inside of a skirt part is hollow and the exchange member is set in this hollow. The exchange member may be exchanged appropriately. In case of this, the exchange member is not always provided with the post member, it may be possible only to set inside the hollow.

The Fifth Variation

Figure 10:
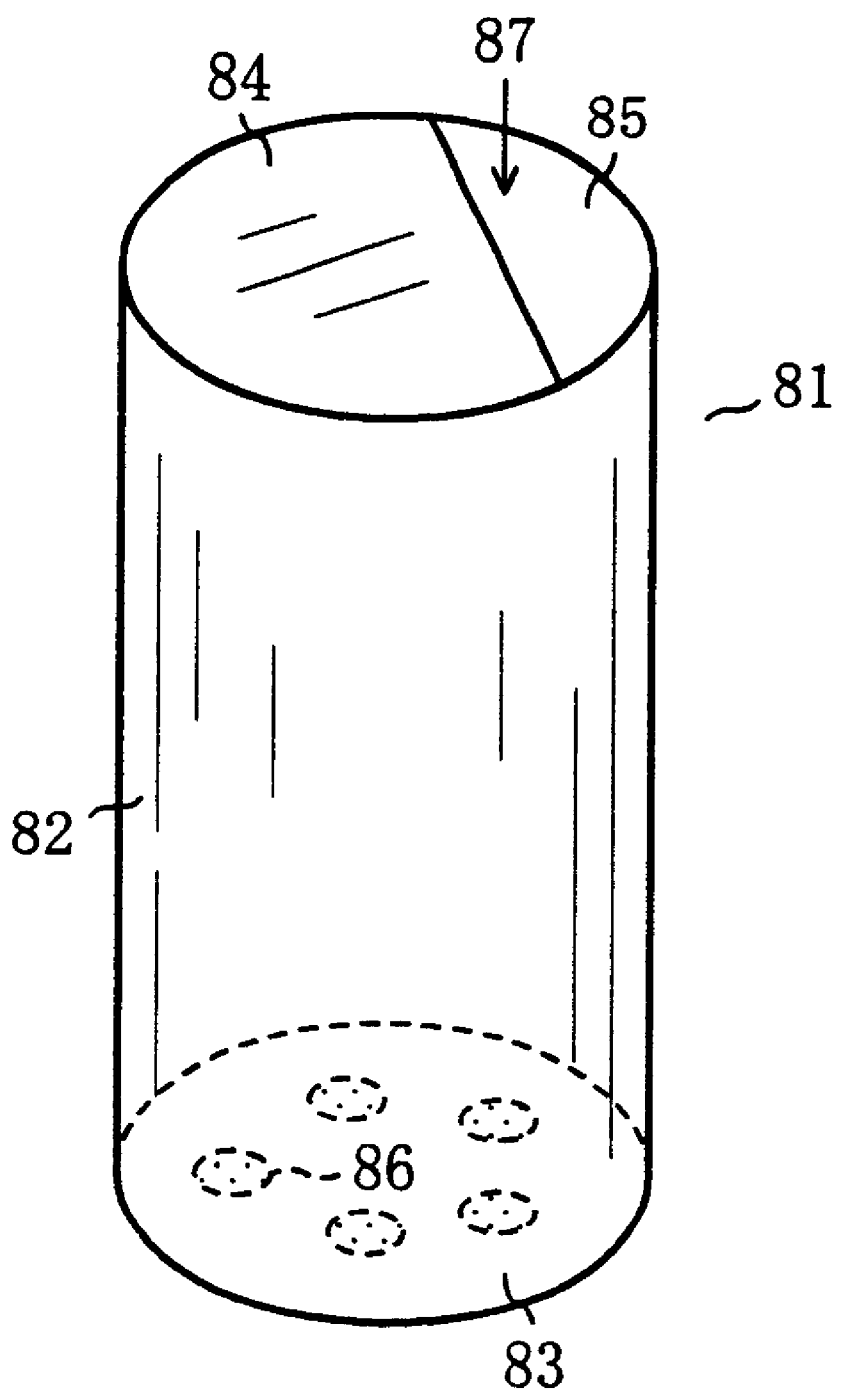
FIG. 10 is a perspective view showing an appearance of the exchange member in the fifth variation of the invention.

FIG. 10 shows an appearance of this exchange member as the fifth variation of the invention. The exchange member 81 consists of the cylindrical material 82. The bottom cover 83 is attached over the bottom side. The top cover 84 which is opened partly is attached over the top side. The adhesive material 85 is applied on all the inside of the cylindrical material 82. On the bottom cover 83, the bait 86 is attached so as to entice insects to come into the inside of the exchange member 81. Insects come into the interior ornament and invade inside of the exchange member 81 through the opening member 87, which is provided between the top cover 84 of the exchange member 81 in this inner space, and the cylindrical material 82. Finally insects are caught by the adhesive material 85. Some glue traps omit an adhesive material 85. In return for an adhesive material, a poison having an immediate effect may be provided with the bait 86, or it is also effective to mix the ingredient that makes the insects which eat the bait hate coming close to the same places.

The Sixth Variation

Figure 11:
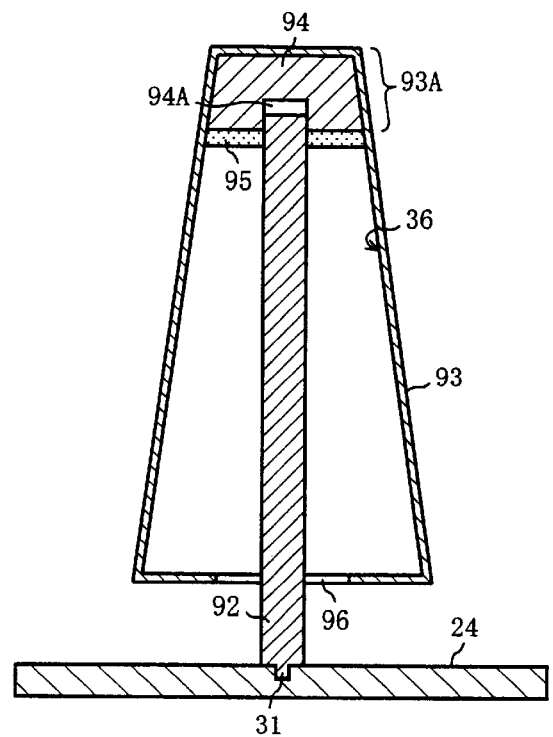
FIG. 11 is a cross-sectional view of the capturing device in the sixth variation of the present invention.

FIG. 11 is a cross-sectional view of the capturing device in the sixth variation of the invention. In FIG. 11, the same number is attached to the same parts as ones in FIG. 1. And explanations about these are omitted. In the sixth variation, the capturing device 91 has the post member 92 which is attached to the attachment hole 31 on the pedestal member 24. The top of the post member 92 pierces into the holder member 94 which is fixed on the inside of the tapered top section 93A of the circular cylindrical cap 93 with a glue, and whose cross-section is T-shaped. The doughnut-shaped bait 95 is attached to the holder member 94. The opening member 96 which is larger than the external diameter of the post member 92 is attached to the bottom of the circular cylindrical cap 93.

Insects not shown in this figure climb up the post member 92 and come into this circular cylindrical cap 93 through the opening member 96. The adhesive member 36 is applied inside the circular cylindrical cap 93. Therefore insects which are enticed by the smell of the bait 95 are caught by the adhesive member 36.

Figure 12:
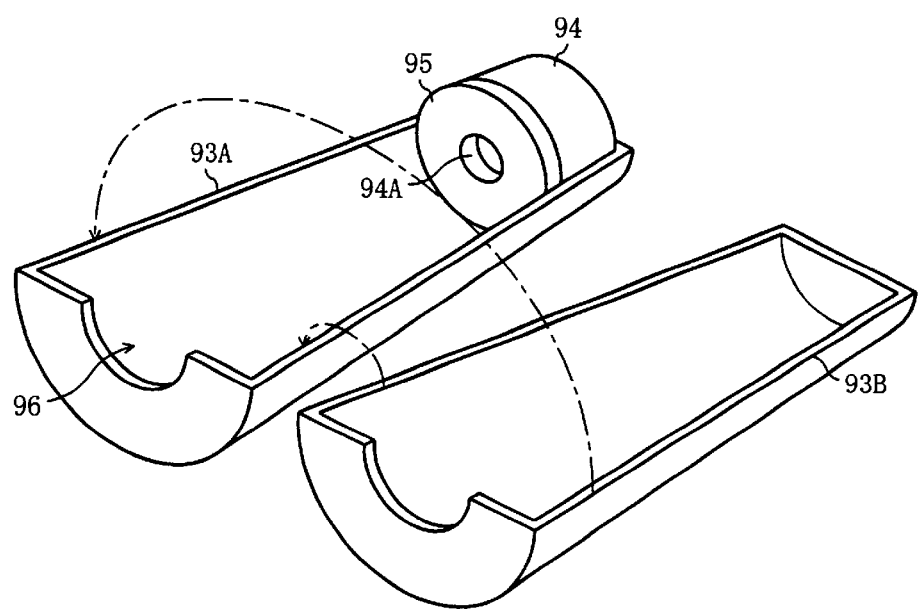
FIG. 12 is a perspective view showing the capturing device of the sixth variation in assembling.

FIG. 12 is an exploded view of the capturing device shown in FIG. 1. The circular cylindrical cap 93 consists of two semicircular cylindrical caps 93A and the holder member 94 which is holding the bait 95. The bait 95 is fixed to one semi-circular cylindrical cap 93A with a glue, and this part and the other semicircular cylindrical cap 93A are put together with glue.

As shown in FIG. 11, the circular cylindrical cap 93 has built-in bait 95 and the holder member 94 is a disposal part. But the pedestal member 24 and the post member 92 which is attached to the pedestal member 24 can be used over and over again. And as it is possible to exchange with holding the outside of the circular cylindrical cap 93, the attachment hole 102 is hygienic. Moreover figures of caught insects like cockroaches are invisible. Therefore the beauties of the capturing device 91 itself doesn't damage. In the case of the capturing device 91 in this variation, it is also possible to attach the ornaments like a doll which is shown in the embodiment over this device.

The Seventh Variation

Figure 13:
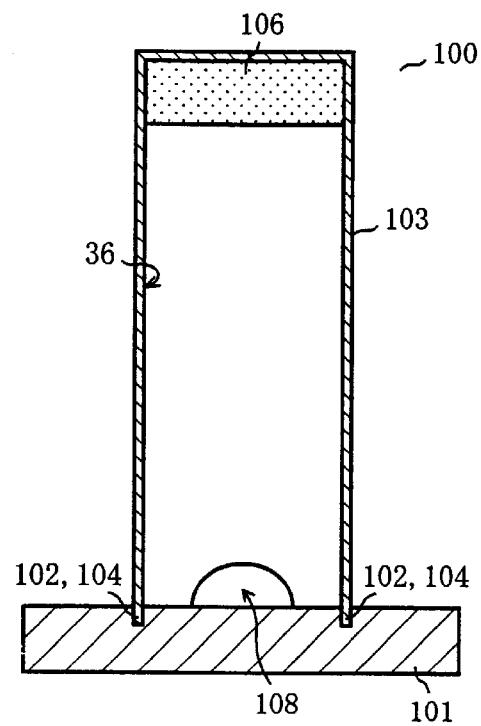
FIG. 13 is a cross-sectional view of the capturing device in the seventh variation.
Figure 14:
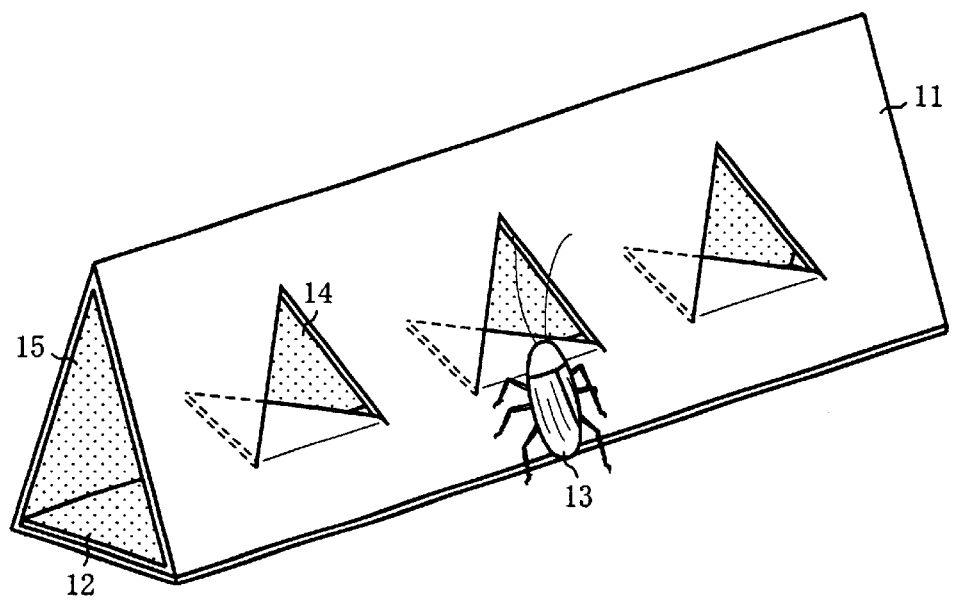
FIG. 14 is a perspective view of an example according to the prior glue trap for catching cockroaches.

FIG. 13 shows an appearance of the capturing device in the seventh variation of the present invention. This capturing device 100 in the seventh variation provides some attachment holes 102 on the pedestal member 101. The projection of the circular cylindrical cap 103 which looks like an inverted glass fits into one of the attachment holes 102 and is fixed there. And it is easy to remove and attach the caps. The bait 106 is set inside the top-part of the circular cylindrical cap 103. The adhesive member 36 is applied inside the other part of the circular cylindrical cap 103. And at the bottom of the circular cylindrical cap 103, one or more opening members 108 are attached.

That is to say, the capturing device 100 in the seventh variation doesn't have a post like the post of the other embodiment or variations. And in the same way as the sixth variation, only one cylindrical member is used. In the seventh variation, it is also possible to removably attach the ornaments like a doll which is shown in the embodiment over the capturing device 100. Material, whose cross section is a trapezoid in the embodiments above, the shape of the exchange member can be a cylinder shown in FIG. 10, a triangular prism, a quadratic prism, or a polygonal prism. Moreover if there is no problem about the cost, its shape can be like a gourd. These exchange members can be set on any places only inside the interior ornament.

It is not necessary to set on the floor. It is also not possible to removably attach the exchange member by making use of projection parts and concave parts inside the ornament. Moreover the exchange member does not always consist of the cylindrical member. The exchange member may be a cubic container or a rectangular parallelepiped receptacle. But these containers have to be provided with the opening member such as a hole so that insects can come in.

In the embodiment, as shown in FIG. 2, though the partitions 35 are provided around the circular cylinder 34, it is possible to provide the inside of the plastic outer capturing cylinder 25 shown in FIG. 1 with the similar partitions. And the shape of the partitions is not so important because the partitions just make a space between two cylinders. Therefore for example, the stick member instead of the partitions can be provided between two circular cylinders. Also if one end of the inner cylinder is set on the cap 26, it is natural that the support stick like these partitions are unnecessary.

In this embodiment and the variation of the present invention, an adhesive member and an enticement member are stationed separately. But it may be one way to intermix and station these two members on one surface. It may be another way to mix both members and to use it. Needless to say, it may be possible to form the adhesive member by applying to the materials which form plastic cylinders or papered cylinders directly and also by sticking something like and adhesive sheet on the se materials.

What is claimed is:

1. A capturing device comprising:

a post member;

a pedestal that supports the post member;

an inner capturing cylindrical member having an interior diameter greater than an exterior diameter of the post member such that the inner capturing cylindrical member fits onto an outer surface of the post member;

an outer capturing cylinder having an interior diameter that is larger than an exterior diameter of the inner capturing cylindrical member, the outer capturing cylinder also having a vertical length shorter than a vertical length of the post member, wherein the outer capturing cylinder fits onto the inner capturing cylindrical member to define a capturing space therebetween where insects can move between an outer surface of the inner capturing cylinder and an inner surface of the outer capturing cylinder and defines an access space between an upper surface of the pedestal and a lower perimeter of the outer capturing cylinder so that insects can only enter the capturing device through the access space;

an adhesive member provided on at least one of the outer surface of said inner capturing cylindrical member and the inner surface of said outer capturing cylinder;

an enticement member provided at the capturing space to entice insects to enter therein; and a decorative member removably attached over the outer capturing cylinder.

2. A capturing device comprising:

a post member;

a fixing member to set a bottom part of the post member on an immobile member;

an inner capturing cylindrical member having an interior diameter greater than an exterior diameter of the post member such that the inner capturing cylindrical member fits onto an outer surface of the post member;

an outer capturing cylinder having an interior diameter that is larger than an exterior diameter of the inner capturing cylindrical member, wherein the outer capturing cylinder fits onto the inner capturing cylindrical member to define a capturing space therebetween where insects can move between an outer surface of the inner capturing cylindrical member and an inner surface of the outer capturing cylinder and defining an access space between the fixing member and the outer capturing cylinder so that insects can only enter the capturing space through the access space;

an adhesive member provided on at least one of the outer surface of said inner capturing cylindrical member and an inner surface of said outer capturing cylinder;

an enticement member provided at the capturing space; and a decorative member removably attached over the outer capturing cylinder.

* * * * *